Dec. 19, 1967    G. B. GERRISH    3,358,811
BELT TURN
Filed Jan. 19, 1966    3 Sheets-Sheet 1
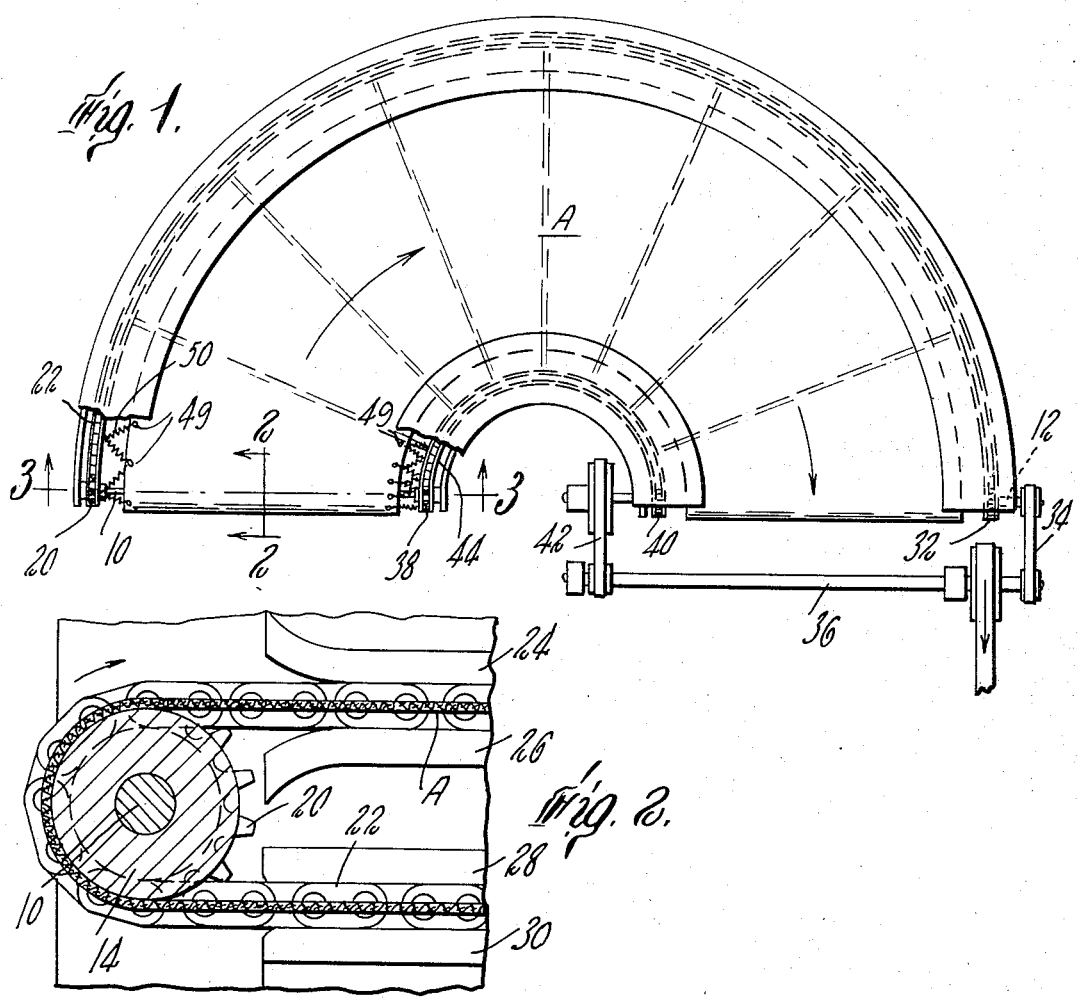
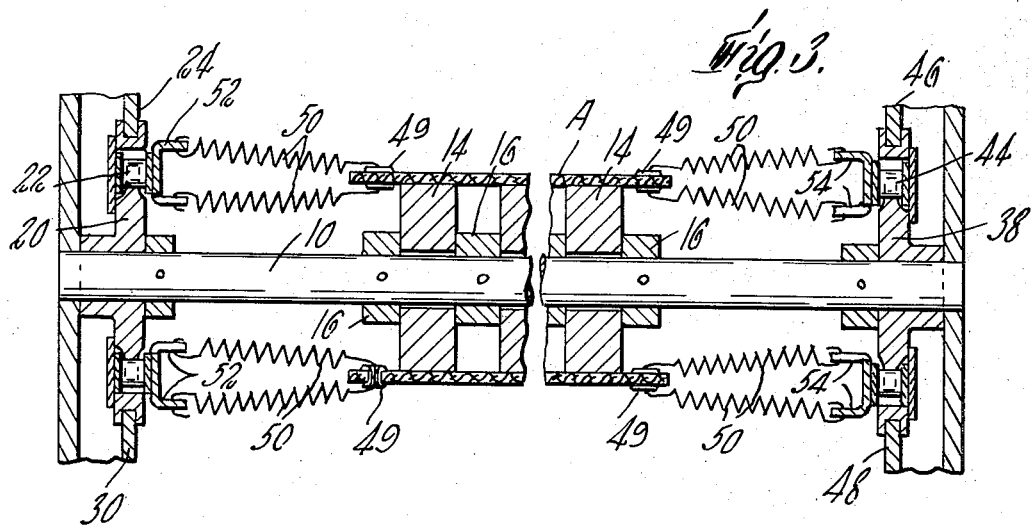

Dec. 19, 1967  G. B. GERRISH  3,358,811
BELT TURN
Filed Jan. 19, 1966  3 Sheets-Sheet 3
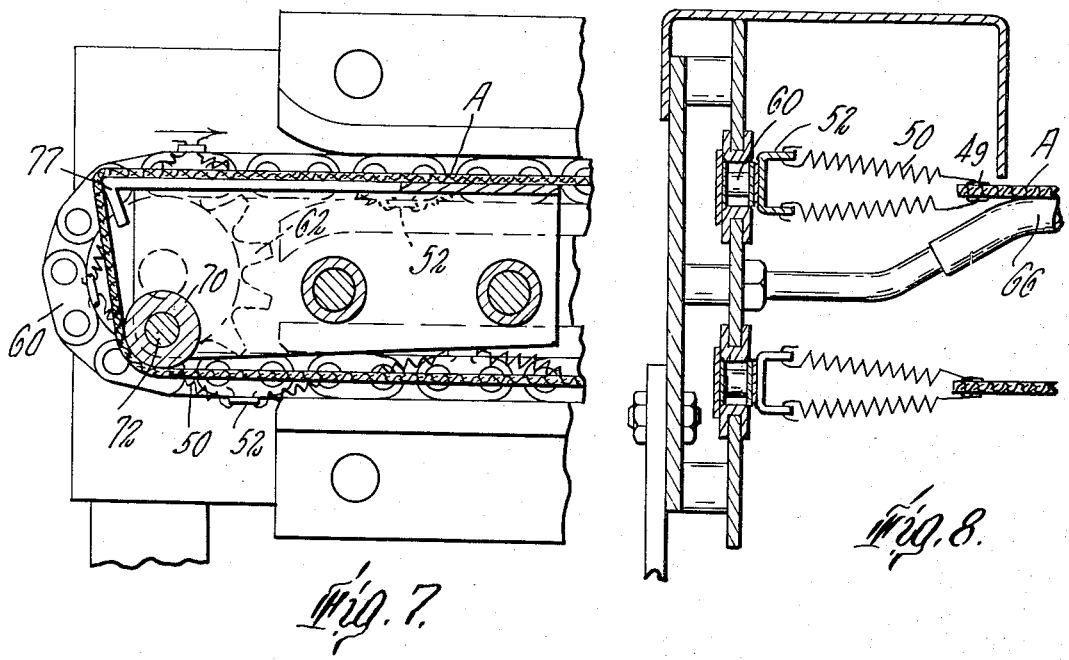
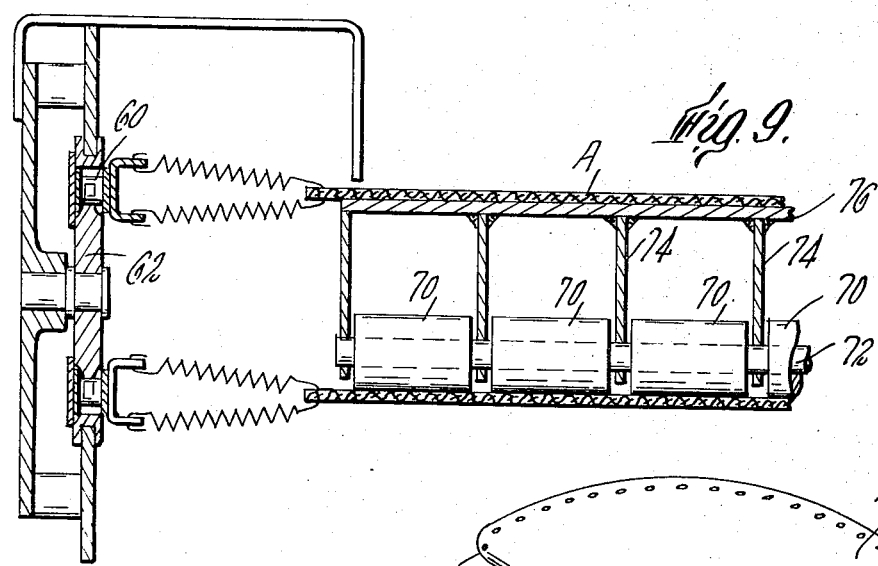
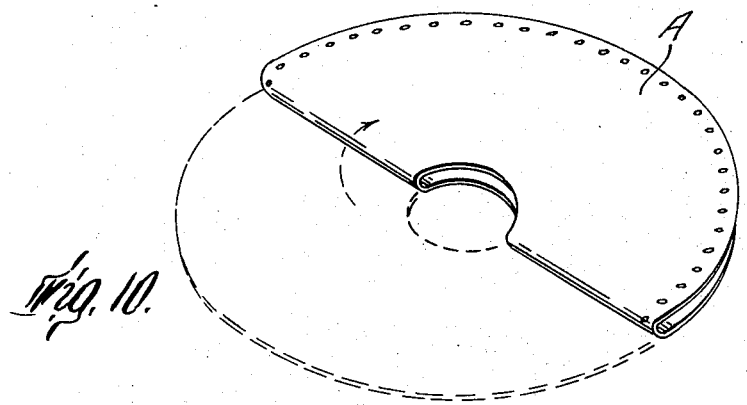

United States Patent Office 3,358,811
Patented Dec. 19, 1967

3,358,811
BELT TURN
Grenville Bradbury Gerrish, 26 Standish Road,
Melrose, Mass. 02176
Filed Jan. 19, 1966, Ser. No. 521,661
10 Claims. (Cl. 198—182)

This invention relates to endless belt conveyors having an arcuate path of travel, often referred to as belt turns, and adapted to be inserted in a conveyor line between two linear flow conveyors arranged at any angle up to and including 180° with respect to each other.

Heretofore such turns have usually had belts passing at both ends over tapered rollers so that the speed of the outer periphery would be just enough faster than the speed of the inner periphery as to prevent the endless sheet material from puckering. Tapered roll mountings, in addition to involving complex structure, cause the input and output end of such turns to be slightly out of register with the straight ends of the adjacent linear flow conveyors causing difficulty in transferring the conveyed product.

A primary object of the invention therefore is to provide an endless belt turn which does not require tapered rolls at any point in the path of belt travel and hence avoids the complexity and disadvantages of such construction.

A further object of the invention is to provide an endless belt turn which has a knife-edge contour at its input end, its output end or both which cannot be achieved with tapered roll mouting.

A further object of the invention is to provide an endless belt turn which utilizes a belt which is simply formed from a flat piece of cloth or other sheet material.

Another object is to provide an endless belt turn construction wherein the belt can be readily removed for cleaning or repair and readily replaced without disturbing the integrity of the belt.

These and other objects of the invention are achieved by driving the endless belt peripherally and by arranging the extent of the arcuate working traverse in such manner that the material moves constantly and evenly through an endless path without detrimental puckering, jamming or tearing.

Typical embodiments of the invention are shown in the accompanying drawing wherein:

FIG. 1 is a plan view partly broken away of a 180° turn;

FIG. 2 is an enlarged cross-sectional view taken along the line 2—2 of FIG. 1;

FIG. 3 is an enlarged cross-sectional view taken along the line 3—3 of FIG. 1, broken away to indicate extent;

FIG. 7 is a cross-sectional view taken along the line 7—7 of FIG. 4;

FIG. 8 is a cross-sectional view taken along the line 8—8 of FIG. 4;

FIG. 9 is a cross-sectional view taken along the line 9—9 of FIG. 4; and

FIG. 10 is a perspective view of a belt used in the construction of FIG. 1, illustrating in dotted lines its method of fabrication from a flat sheet of material.

Figure 4:
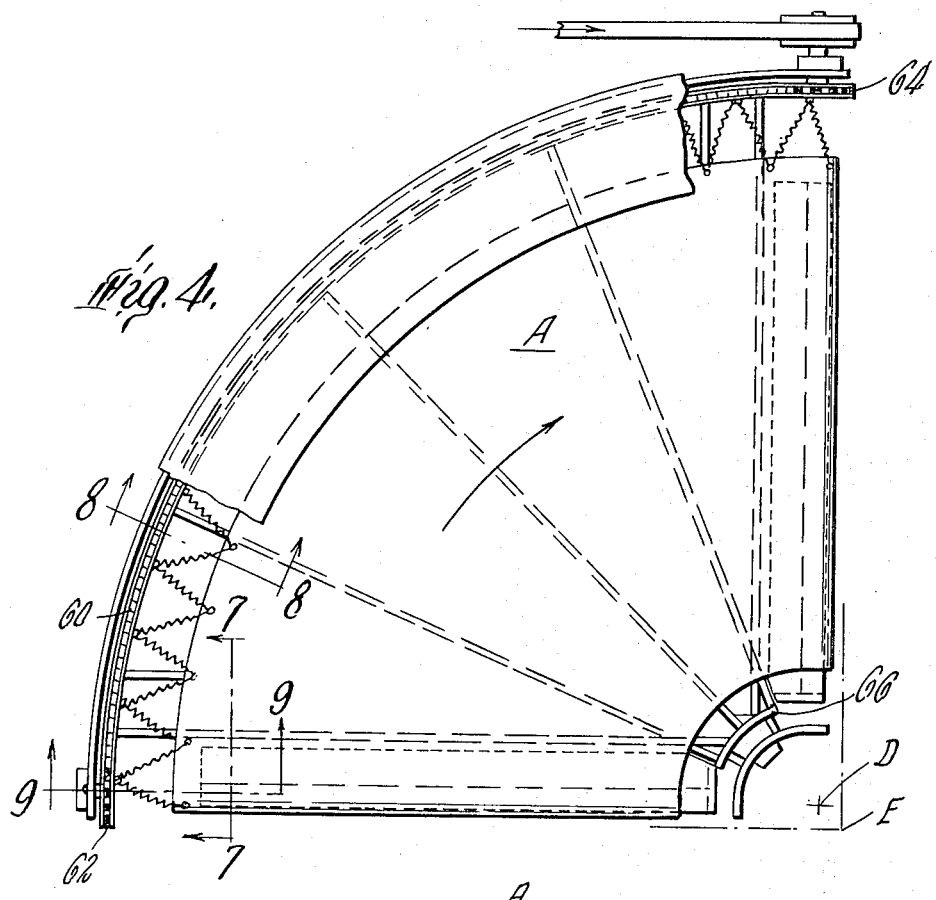
FIG. 4 is a plan view, partly broken away, of a 90° turn constructed in accordance with the invention.
Figure 5:
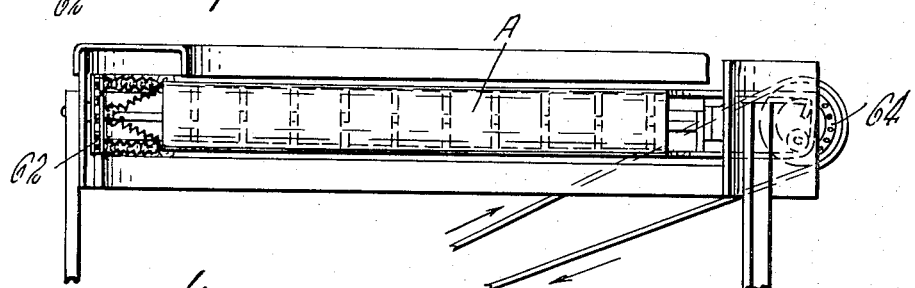
FIG. 5 is an elevational view of the input end of the apparatus shown in FIG. 4.

FIG. 10 shows, in the dotted line form, a flat annulus of flexible sheet material which has been folded over on itself. If the upper and lower surfaces of the folded material could be collapsed into the same plane, the area would be enclosed in a true semi-circle having as a center the original center of the annlus. However, since the layers cannot merge, the top layer or working traverse of the maetrial must lie in a single plane within the peripheral boundaries of the original semi-circle but with the planar surface terminating in straight lines, one or both of which will be offset toward the material from the axis of the original unfolded annulus.

In accordance with the 180° form of turn, means are thus provided for supporting this folded annulus so that a top portion of it lies in a substantially horizontal plane constituting a curved working traverse extending between two straight lines, each of which is parallel to one of two radii of the original annulus, but at least one of which, and preferably both of which, as shown in the drawing, are offset toward the material from the radius with which it is parallel.

For this purpose I provide a frame which supports two aligned shafts 10 and 12, as shown in FIG. 1, whose common axis is parallel to and directly below the radial extremities of the portion of the material which is to constitute the plane working traverse. Each shaft carries a series of equal diameter rolls 14 which have paths of revolution tangential to the plane working traverse and transverse to the radial boundaries thereof. These rolls are mounted on shafts 10 and 12 for free rotation relative thereto and may be spaced therealong with the use of intervening spacers 16.

The outer extremity of shaft 10 carries an idler sprocket wheel 20 over which runs an endless chain 22 which is guided along its upper traverse between upper and lower curved rails 24 and 26 and, on its lower traverse, between upper and lower curved rails 28 and 30. The outer extremity of shaft 12 likewise carries a sprocket wheel 32 at the other end of the curved rails, but this sprocket is driven through belt 34 from the drive shaft 36.

Similarly, the inner end of shaft 10 carries an idler sprocket wheel 38 and the inner end of shaft 12 carries a sprocket wheel 40 driven through belt 42 from drive shaft 36. A second inner chain 44 runs over these sprocket wheels 38 and 40 and is supported between curved rails 46 and 48 on its upper and lower intervening traverse.

As shown in FIG. 3, the sheet material A is suspended throughout its entire length between circumscribing chain 22 and inscribing chain 44, for which purpose its inner and outer peripheries are provided with a series of spaced grommets 49 into which are hooked the extremities of individual coil springs 50 whose other extremities are hooked into apertures in a series of clips 52 on chain 22 and 54 on chain 44 alternately offset above and below the median path of travel of the chains, so as to connect the sheet A resiliently to both chains for travel along a path following the median lines of travel of the chains.

As will be noted, the ends of the plane of the upper working traverse are thus two straight lines which lie in a vertical plane intersecting the axes of shafts 10 and 12, and offset, equally toward the material from, but both parallel to, a diameter of the original annulus.

Belts 34 and 42 run over pulleys of such diameters that chain 22 is driven at a speed to drive the outer periphery of material A at a speed such that a point thereon traverses the curved distance between the ends of the traverse at its radius in the same time that a point on the inner periphery of material A traverses the curved distance between the ends of the traverse at its radius. The motion of the belt can thus be accomplished without a puckering.

The machine may have further stationary supports for supporting the belt if desired, as will be more fully understood in connection with the description of a different embodiment of the invention as shown in FIGS. 4–10, which will now be described.

The embodiment of FIGS. 4–10 differs from that shown in FIG. 1 in two respects. First, it has a 90° working traverse instead of 180°. Secondly, it has a knife-like input edge on its working traverse.

Figure 6:
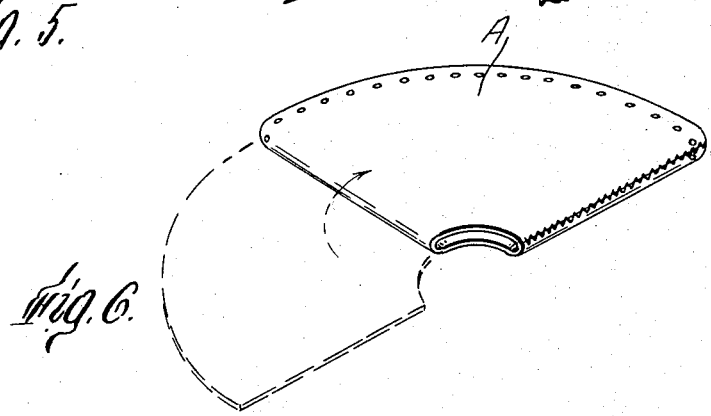
FIG. 6 is a perspective view of an endless belt material as utilized in the apparatus of FIG. 4, and illustrating in dotted lines its method of fabrication from a flat sheet of material.

To accomplish the first difference, the flexible belt is in this case made from a semi-annulus of flat sheet material as indicated in FIG. 6, by folding and seaming the material end-to-end into an endless configuration. The frame of the machine is modified so that the outer endless chain 60 traverses only a quadrant between sprocket wheel 62 and sprocket wheel 64; and the inner chain is omitted entirely. The chain clips, coil springs and grommets are provided as in FIG. 1 at the outer periphery only. The inner periphery is therefore supported by means of spider supports 66 whose outer ends are bent downwardly and mounted in the frame as shown in FIG. 8 between the chain traverses so that they clear the clips.

At the input and output ends of the working upper traverse, the rollers, instead of being coaxial with, and of equal radius with the median radius of the sprocket wheels as in FIG. 1, are of smaller radius. These rollers are shown at 70, being carried by a shaft 72 at the input end. The shaft is suspended through vertical spaced frame plates 74 which are topped by a cover plate 76 having a turned-down sharp edge at 77 (FIG. 7). While the chain 60 thus traverses a true radius about the sprocket wheel 62, the material A follows a modified path, of substantially equal overall length between the upper and lower traverses but providing the knife-edge input as the belt passes over the edge 77. An identical construction is shown as being utilized at the output end. It will thus be seen that the two knife edges are perpendicular to each other and lie near and just beneath the radial boundaries of a quadrant forming the upper working traverse that has as a center the point D which is inset toward the endless belt from the common axis E of the peripheries of the upper and lower traverses, i.e. inset from the original center E of the semi-annulus (FIG. 4). The upper traverse ends are thus defined by two straight lines having a 90° relationship, both of which are parallel to radii of the original annulus having the center E but are offset equally toward the material from these radii.

In both embodiments as shown, the lower return traverses of the chain or chains and of the sheet material A lie in planes substantially parallel to the plane of the working traverse and the portions of the material in these planes are substantially co-extensive and are connected at their ends by connecting portions of the material extending 180° around axes which lie in a plane midway between the upper and lower traverses and perpendicular to the axis of the peripheries of the material traversing the plane traverses.

An inner chain, similar to that utilized in the construction of FIG. 1, but having only a quadrant traverse may be added to the construction shown in FIG. 4 but has been found to be unnecessary. Its omission permits the folded semi-annulus, when freed from the chain 60 by unclipping the coil springs, to be pulled radially inwardly off of the frame for replacement or repair. In many applications the inner chain may be omitted from the construction shown in FIG. 1 with similar benefit.

It will be understood that the knife edge construction of FIG. 4 and the radius construction of FIG. 1 at the input and output ends are interchangeable.

It is also to be understood that the total turn angle may be any angle other than 90° or 180°. Without departing from the principle of the invention, the size of the sector of the flat annulus from which the belt is made may be chosen to provide the required overall angle.

So, too, instead of offsetting the straight line boundaries equally from the radii of the original annulus, one may be offset slightly more and the other slightly less than equally, but nothing is gained by such unsymmetrical configuration over the symmetrical configurations shown in the drawings.

For the purposes of the claims hereinafter recited, the flat annulus shown in FIG. 10 is referred to as an annulus having its inner and outer circular peripheries lying in the same plane; while the folded semi-annulus shown in FIG. 6 is typical of any endless belt formed by seaming end-to-end any sector of a whole flat annulus and may be referred to as being, when manipulated into truncated cone shape, an annulus whose inner and outer circular peripheries lie in parallel planes. All of these constructions, including the whole flat annulus, fall within the generic description of having the shape either of a truncated cone or of the projection of the walls of a truncated cone on its own base.

What is claimed is:

1. A belt turn conveyor comprising: an endless belt having conveying and return traverses generally shaped as sectors of circles, and end portions interconnecting corresponding end limits of said traverses, said traverses and said end portions defining a folded outer radial edge of said belt; support means located intermediate said traverses for supporting said conveying traverse and including belt reversing means at each of said end portions; an endless drive member carried by said support means, disposed radially with respect to said traverses and movable about a path conforming generally to said folded outer radial edge of said belt; resilient means connected between respective portions of said drive member and said belt for urging a tension force between said drive member and said belt and for transmitting drive forces to said belt from said drive member; and at least one of said belt reversing means comprising an elongated rotatable member in engagement with said belt to define one end limit of said return traverse and an elongated plate member having a generally straight edged portion extending radially with respect to said conveying traverse and in engagement with said belt to define one generally straight edged end limit of said conveying traverse.

2. A belt turn conveyor as set forth in claim 1 wherein both of said belt reversing means comprise an elongated rotatable member in engagement with said belt to define one end limit of said return traverse and an elongated plate member having a generally straight edged portion extending radially with respect to said conveying traverse and in engagement with said belt to define one generally straight edged end limit of said conveying traverse.

3. A belt turn conveyor as set forth in claim 1 wherein said support means includes a plurality of arcuately spaced elongated elements extending radially with respect to said conveying traverse.

4. A belt turn conveyor as set forth in claim 1 wherein the longitudinal axis of said rotatable member forms a smaller angle with respect to the other end limit of said conveying traverse than does said straight edged portion of said plate member such that the corresponding end portion between said one end limits has a generally inclined profile.

5. A belt turn conveyor as set forth in claim 1 wherein said return traverse lies in a plane generally parallel with the plane of said conveying traverse; and said drive member lies generally in the same planes of said traverse and said end portions.

6. A belt turn conveyor as set forth in claim 5 wherein said traverses have their respective centerpoints on a common line; and both of said belt reversing means comprise an elongated rotatable member in engagement with said belt to define one end limit of said return traverse and an elongated plate member having a generally straight edge portion extending radially with respect to said conveying traverse and in engagement with said belt to define one generally straight edged end limit of said conveying traverse.

7. A belt turn conveyor as set forth in claim 5 wherein said traverses have their respective centerpoints on a common line; the longitudinal axis of said rotatable member forms a smaller angle with respect to the other end limit of said conveying traverse than does said straight edge portion of said plate member such that the corresponding end portion between said one end limits has a generally inclined profile.

8. A belt turn conveyor as set forth in claim 6 wherein said support means includes a plurality of arcuately spaced elongated elements extending radially with respect to said conveying traverse; the longitudinal axis of said rotatable member forms a smaller angle with respect to the other end limit of said conveying traverse than does said straight edge portion of said plate member such that the corresponding end portion between said one end limits has a generally straight lined inclined profile.

9. A belt return conveyor as set forth in claim 8 wherein each of said elements of said support means is rotatable and includes a plurality of longitudinally cylindrically shaped rollers; said rotatable member of said belt reversing means includes a plurality of longitudinally arranged cylindrically shaped rollers; said plate member is a flat member engaging a portion of said belt along said conveying traverse.

10. A belt turn conveyor as set forth in claim 6 wherein the longitudinal axis of said rotatable member forms a smaller angle with respect to the other end limit of said conveying traverse than does said straight edged portion of said plate member, such that the corresponding end portion between said one end limits has a generally straight lined inclined profile.

References Cited
UNITED STATES PATENTS

| | | | |
|---|---|---|---|
| 1,494,655 | 5/1924 | Westerman | 198—184 |
| 2,128,595 | 8/1938 | Rasmussen | 198—184 |
| 2,253,913 | 8/1941 | Paterson | 198—182 |
| 3,027,852 | 4/1962 | Key | 198—34 X |
| 3,153,475 | 10/1964 | Swanson | 198—182 |
| 3,270,863 | 9/1966 | Ackles | 198—181 X |

EDWARD A. SROKA, *Primary Examiner.*

EVON C. BLUNK, *Examiner.*